A. A. TOWNE.
COMBINATION TOOL.
APPLICATION FILED APR. 14, 1913.
1,084,176.
Patented Jan. 13, 1914.
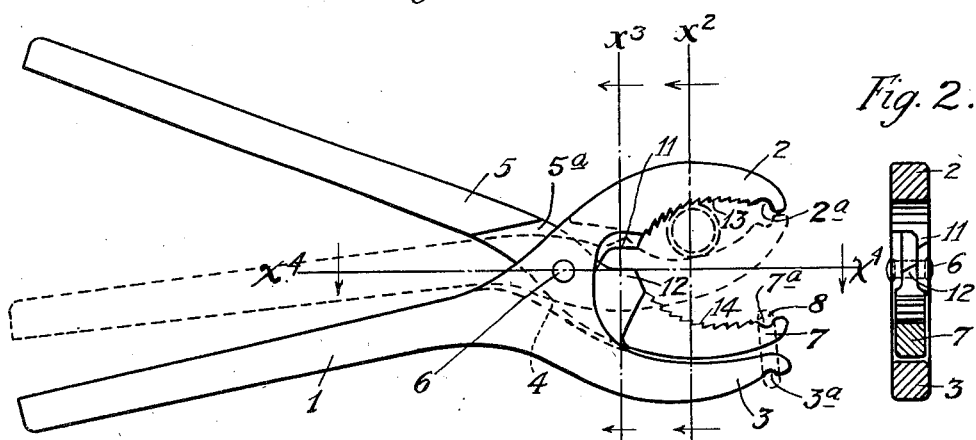

UNITED STATES PATENT OFFICE.

AMOS A. TOWNE, OF LONGBEACH, CALIFORNIA.

COMBINATION-TOOL.

1,084,176.  Specification of Letters Patent.  Patented Jan. 13, 1914.

Application filed April 14, 1913. Serial No. 761,052.

*To all whom it may concern:*

Be it known that I, AMOS A. TOWNE, a citizen of the United States, residing at the city of Longbeach, State of California, have invented a new and useful Combination-Tool, of which the following is a specification.

One of the objects of this invention is to provide a tool that can be used to spread open a link of a chain preparatory to attaching such chain to a fitting, and then to press into said fitting the ends of the loop of metal which forms said link.

Another object is to provide a combination tool that will perform the functions of a pipe wrench and of a wire cutter without interfering with the uses already mentioned.

Referring to the accompanying drawings, which illustrate the invention, Figure 1 is a side elevation of the tool, illustrating the use thereof as a device to spread the links of a chain and as a pipe wrench. Fig. 2 is a cross-section on line $x^2$—$x^2$ of Fig. 1. Fig. 3 is a cross-section on line $x^3$—$x^3$ of Fig. 1. Fig. 4 is a transverse section on line $x^4$—$x^4$ of Fig. 1. Fig. 5 is a broken plan view showing the jaw and shank of the movable member. Fig. 6 illustrates the jaws of the tool in position to spread a link of a chain. Fig. 7 illustrates said jaws in position to close up said link.

Referring in detail to the drawings, the main arm or stationary member 1 is provided with a pair of jaws 2 and 3 which are always in fixed relation to each other and to said arm 1. Said member 1 is furnished with a slot 4 through which extends an auxiliary arm 5, said arm 5 being pivoted to arm 1 by a rivet 6. It will be noted that the slot 4 through the member 1 is narrower than jaw 7, but in assembling, the slot 4 may be swaged open wide enough to receive the jaw 7 and may then be closed down upon the shank $5^a$. Said auxiliary arm 5 is provided with a movable jaw 7 which is movable from one to the other of jaws 2 and 3 as best shown in Fig. 1, where a chain link 8 is also shown, looped over jaws 3 and 7 in position to be spread open. Jaw 3 is provided with a notch $3^a$ on the outer side, and jaw 7 with a notch $7^a$ on the inner side, said notches receiving said link, as shown. Jaw 2 is likewise provided with a notch or seat $2^a$ to receive one of the outer sides of a link when the same is compressed between jaws 2 and 7, the seat $7^a$ in such case receiving the other outer side of the link.

Jaw 2 is provided with a wire-cutting lip 11 and jaw 7 with a coöperating lip 12. Jaws 2 and 7 are also respectively provided with pipe-gripping teeth 13 and 14, the teeth 13 being reversely directed to the teeth 14.

The operation is best illustrated in Figs. 1, 6 and 7. In Fig. 6 the end portions of jaws 2 and 7 are indicated, in position to spread open the link 8 until said link appears as shown in Fig. 7, the latter view illustrating the jaws 2 and 7 in position to close said link up to fasten the same to the fixture 21, by pressing the ends of the link into the sockets 22 of said fixture, said sockets being indicated in dotted lines.

I claim:

A combination tool comprising a member having two jaws in a permanently open position, one of said jaws having an inner seat and the other of said jaws having an outer seat, said seats being adapted to receive a link of a chain, and an inside jaw movable from one toward the other of said open jaws, said inside jaw having a link-receiving seat to coöperate with the first mentioned seats.

In testimony whereof I have hereunto signed my name in the presence of two subscribing witnesses at Los Angeles, in the county of Los Angeles and State of California, this 7th day of April, 1913.

AMOS A. TOWNE.

Witnesses:
 ALBERT H. MERRILL,
 LILLIAN YOUNG.

---

Copies of this patent may be obtained for five cents each, by addressing the "Commissioner of Patents. Washington, D. C."